United States Patent [19]

Ho

[11] Patent Number: 5,050,656
[45] Date of Patent: Sep. 24, 1991

[54] NON-PNEUMATIC TIRE WHEEL

[75] Inventor: Fanghuai H. Ho, Broadview Heights, Ohio

[73] Assignee: The B.F. Goodrich Company, Akron, Ohio

[21] Appl. No.: 513,378

[22] Filed: Apr. 23, 1990

[51] Int. Cl.⁵ .............................................. B60C 7/14
[52] U.S. Cl. .......................................... 152/11; 152/5
[58] Field of Search .................. 152/1, 5, 6, 7, 11, 152/12, 17, 41, 246, 251, 253, 254, 256, 257, 259, 270, 271, 273, 520

[56] References Cited

U.S. PATENT DOCUMENTS

| | | | |
|---|---|---|---|
| 822,615 | 6/1906 | Langstaff | 152/11 |
| 1,498,603 | 6/1924 | Andrews | 152/11 |
| 2,322,454 | 6/1943 | Keough | 152/12 |
| 2,853,337 | 9/1958 | Boschi | 152/41 X |
| 4,549,590 | 10/1985 | Sahagian | 152/41 |
| 4,558,727 | 12/1985 | Golata et al. | 152/5 |
| 4,705,087 | 11/1987 | Marrow et al. | 152/5 |

FOREIGN PATENT DOCUMENTS

| | | | |
|---|---|---|---|
| 864699 | 5/1941 | France | 152/12 |
| 3807 | of 1914 | United Kingdom | 152/11 |
| 8705267 | 9/1987 | World Int. Prop. O. | 152/5 |

Primary Examiner—Russell D. Stormer
Attorney, Agent, or Firm—Joseph Januszkiewicz

[57] ABSTRACT

A non-pneumatic tire wheel having an annular hub with a carcass connected thereto, which carcass has C-shaped sidewalls with a plurality of circumferentially spaced slots that extend into the crown of the carcass. The crown of the tire wheel receives a tread ring to enhance rolling. The hub receives a circumferentially extending shock absorbing element that is curvilinear in cross section with slots extending radially from the hub.

24 Claims, 5 Drawing Sheets

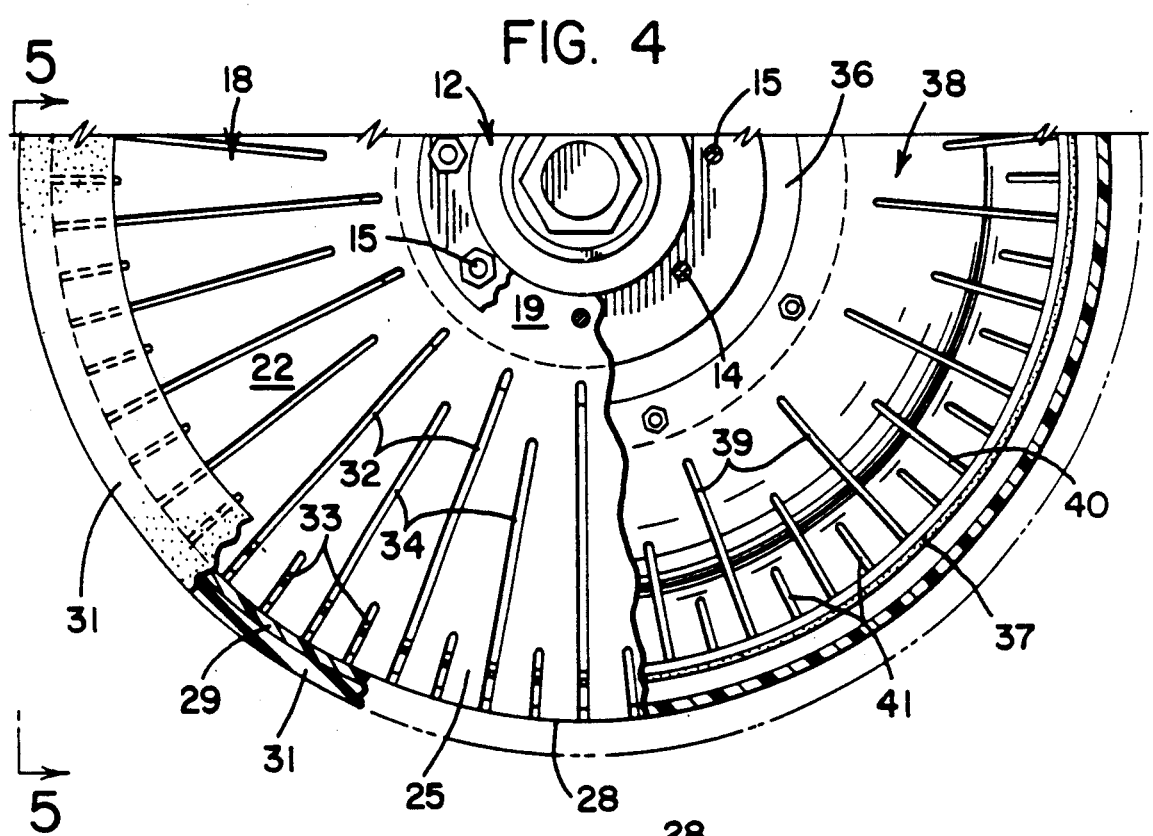
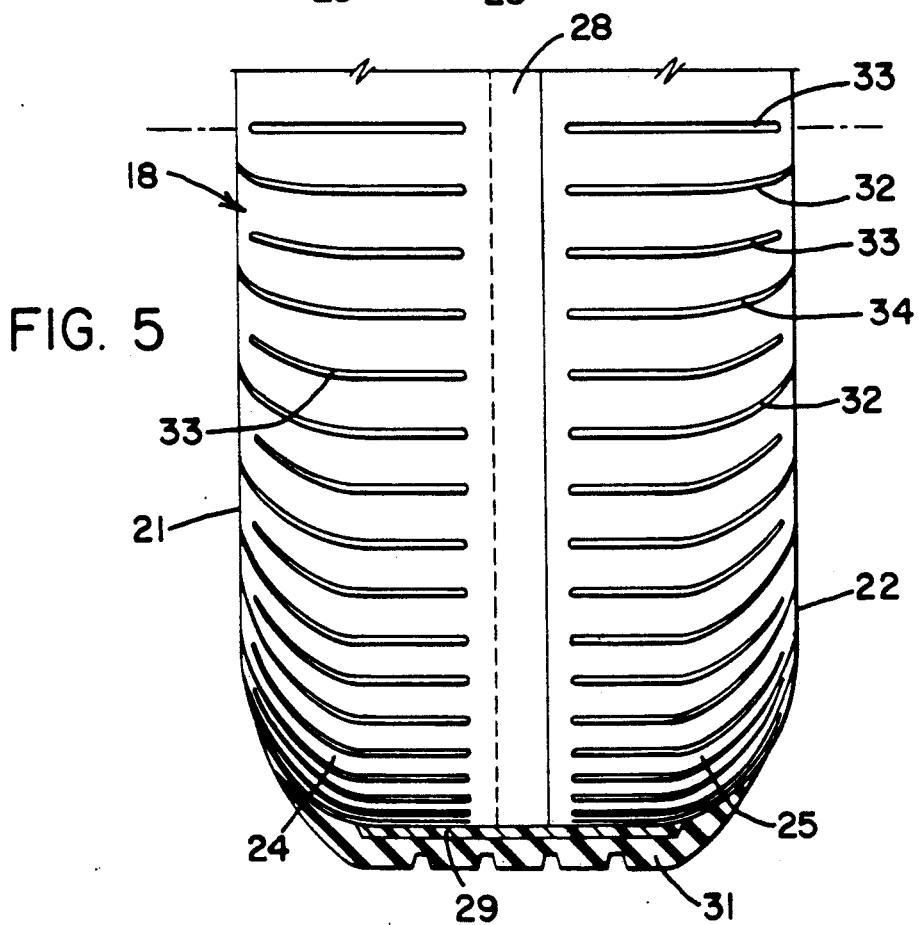

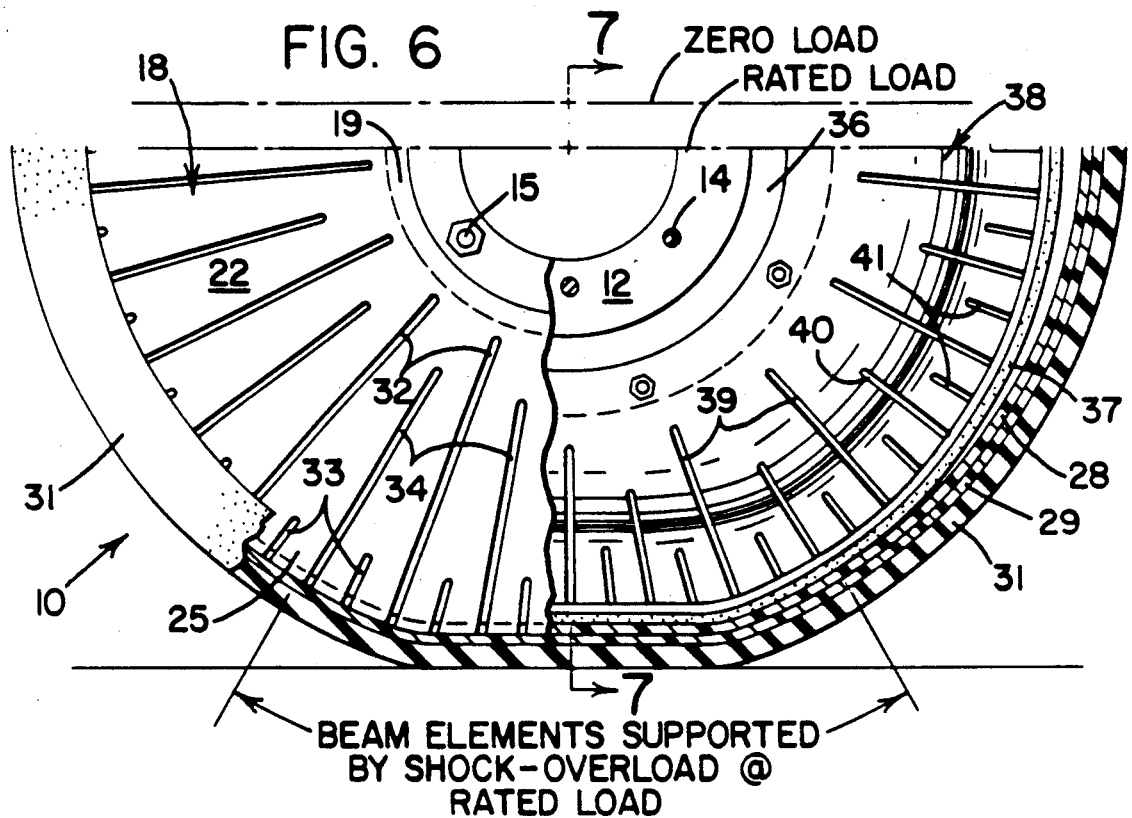
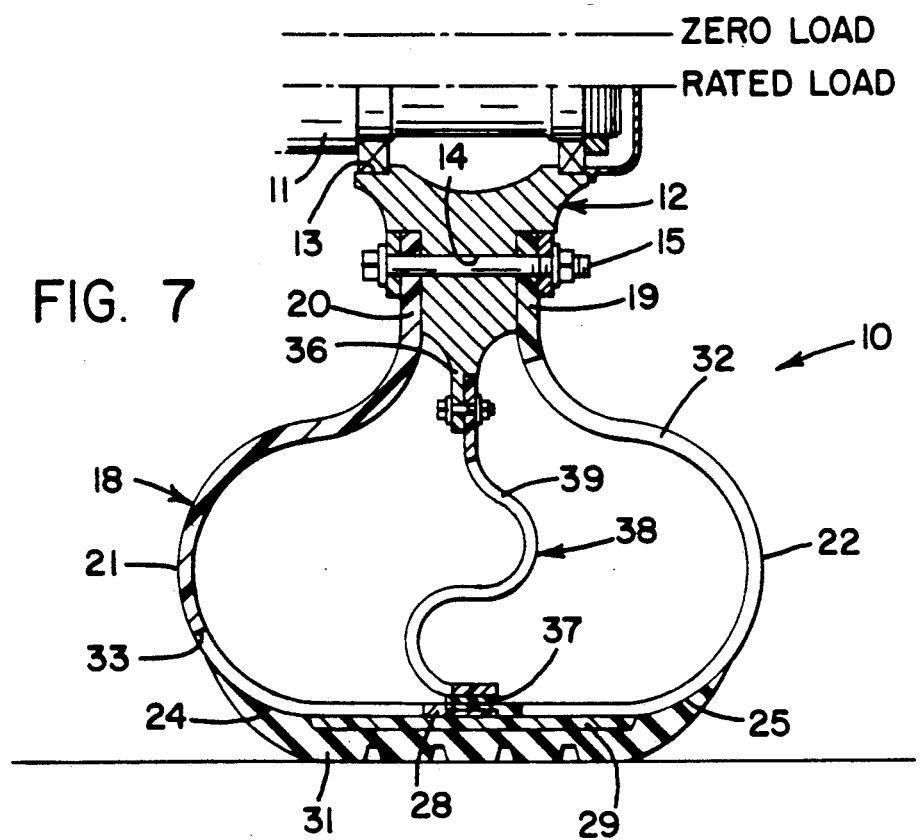

NON-PNEUMATIC TIRE WHEEL

This invention relates to a non-pneumatic tire wheel structure and more particularly to a light-weight wheel structure that is non-pneumatic yet has resilient capabilities and the ability to sustain severe damage, impact loading as for use on helicopters.

Heretofore, helicopters have used skids and relied essentially on the lifting ability of the rotating blades. However, it since has been found that the use of pneumatic tires providing a forward rolling action enhanced the ability of the helicopter to take off. The present invention is directed to a non-pneumatic tire wheel structure which can sustain severe damage yet operate as a direct replacement of the pneumatic tire thereby eliminating the vulnerability thereto under adverse battle field conditions. Where a tire is damaged there is a severe restriction on the mobility of the helicopter as the craft is tilted, resulting in also tilting the rotating blades which greatly restrict access to the craft and where unnoticed because of the partial tilting can inflict grave and serious injury to personnel. The tire wheel of the present invention assures the needed weight reduction capabilities that is essential as well as providing for the necessary energy absorption capabilities under impact loading situations. In addition, the non-pneumatic wheel-tire provides for the needed load-carrying requirements where such wheel-tire is a direct replacement of the pneumatic tire heretofore used on the specific craft thereby maintaining an economic benefit of direct replacement.

SUMMARY OF THE INVENTION

The invention is directed to a non-pneumatic tire wheel made from a composite material that is toroidal in shape for replacement of an inflatable tire having an annular carcass that is yieldable. The sidewalls of the carcass have a plurality of circumferentially spaced slots that define rigid beam members that yield under load and impact, with the outermost crown portion of the toroidal tire wheel having a rigid ring and an elastomeric tread or tread ring for ground engaging effect. A shock absorbing member is mounted within the carcass connected to an annular hub of the tire wheel to enhance resiliency and shock impact loading of the tire wheel.

DESCRIPTION OF THE DRAWINGS

For the purpose of illustrating this invention, reference will henceforth be made to the drawings the forms which are presently preferred; however, it should be understood that the invention is not necessarily limited to the precise arrangements as the drawings and the embodiment described is merely illustrative of the invention.

FIG. 4 is a side elevational view of the tire wheel structure seen in FIG. 3 taken on line 4—4 thereof, with a portion of the tread, belt and body structure broken away;

FIG. 5 is a front elevational view of the tire wheel structure shown in FIG. 4 with the tread and belt broken away and taken on line 5—5 of FIG. 4;

FIG. 6 is a side elevational view of the tire wheel structure as seen in FIG. 4 but under load and additionally supported by a shock absorber;

FIG. 7 is a front elevational view of the tire wheel structure taken on line 7—7 of FIG. 6;

DESCRIPTION OF THE PREFERRED EMBODIMENT

Figure 1:
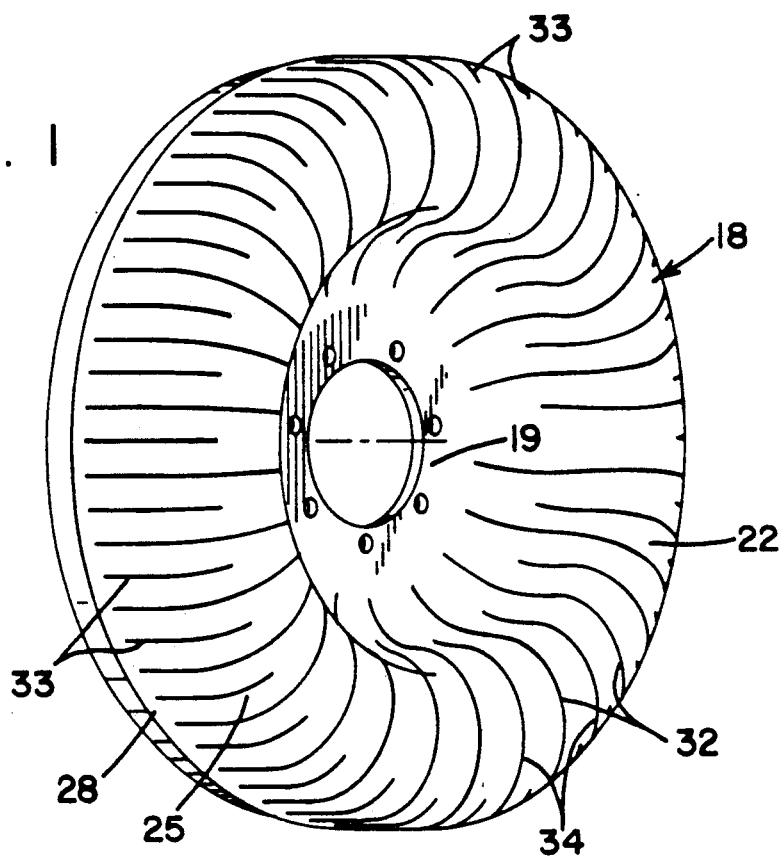
FIG. 1 is a perspective view illustrating one half of the tire wheel structure of the present invention without the tread applied.
Figure 2:
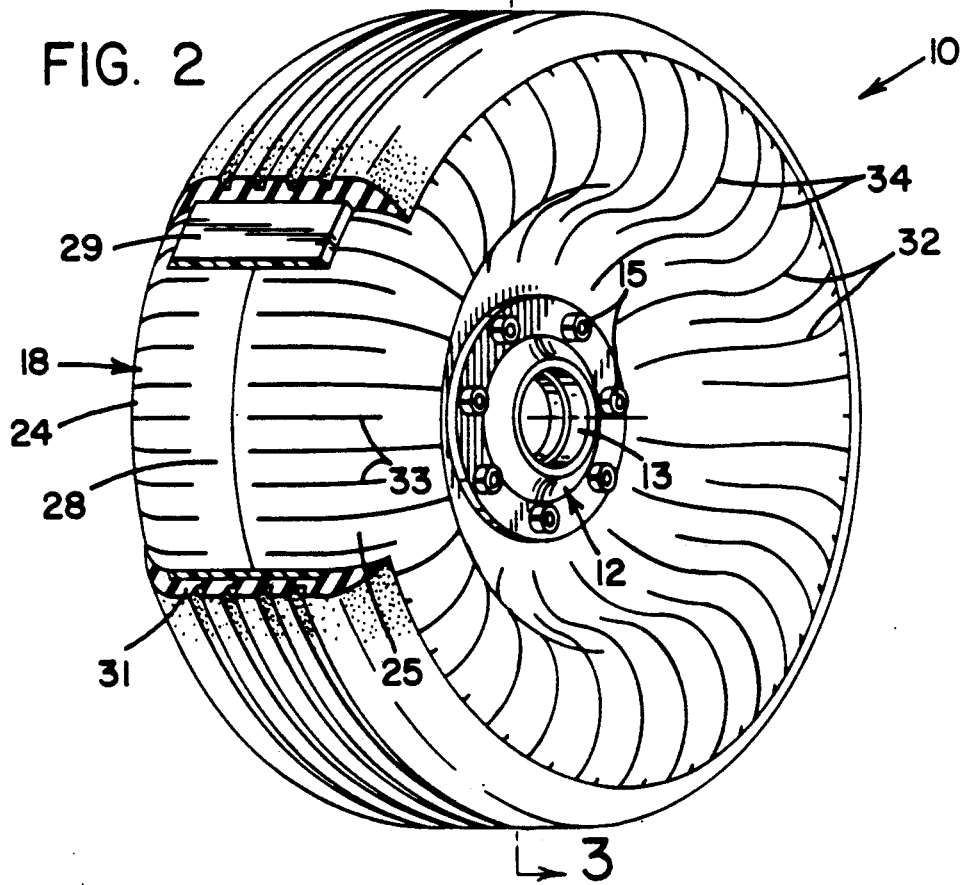
FIG. 2 is a perspective view of the tire wheel structure showing the wheel and tire carcass with a portion of the tread and belt structure cut away to illustrate the supporting structure.
Figure 3:
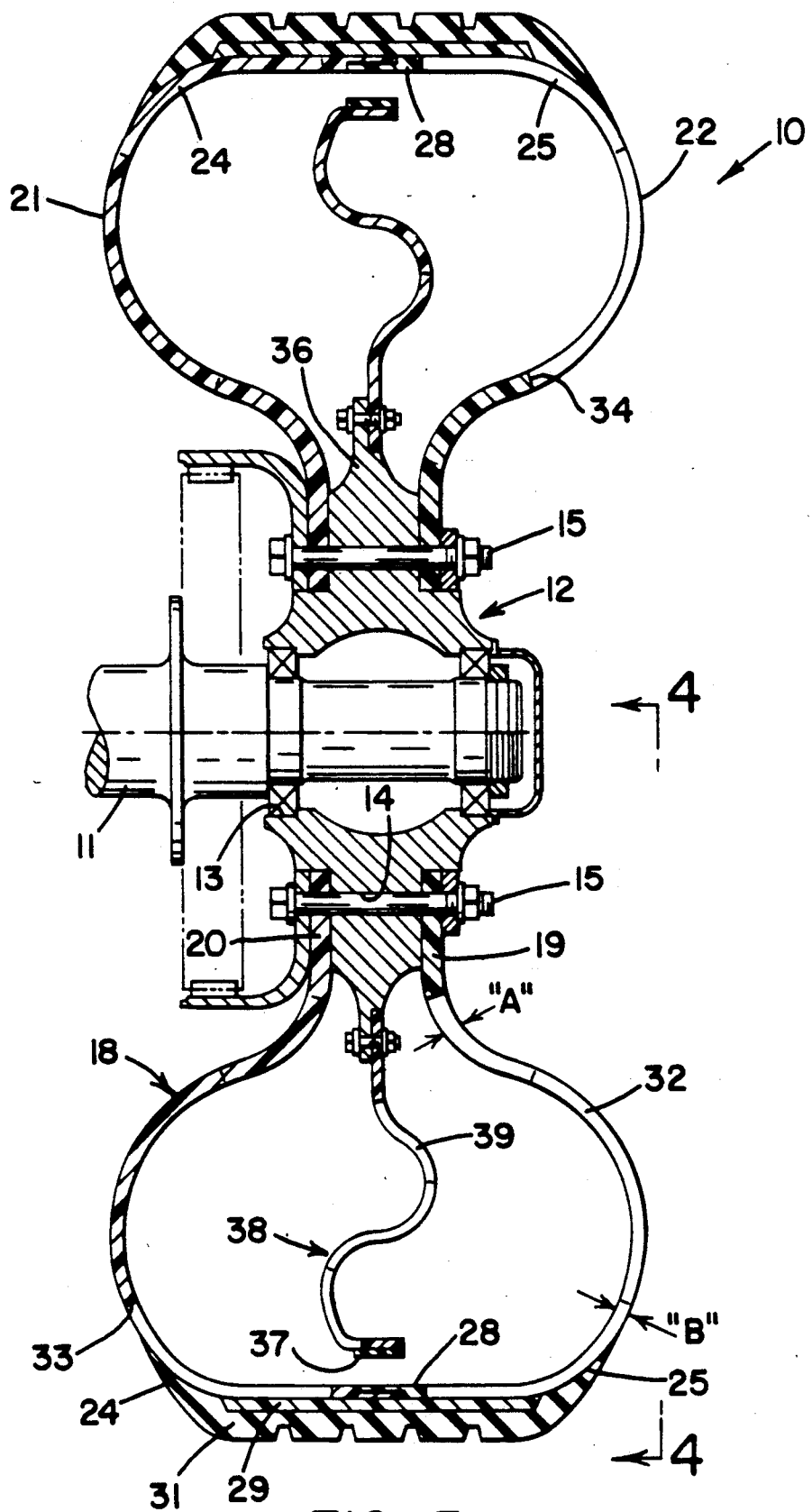
FIG. 3 is a cross-sectional view of the tire wheel structure taken on line 3—3 of FIG. 2 shown mounted on the axle of a vehicle.

Referring now to the drawings, wherein like references numerals designate like or corresponding parts throughout the several views, there is shown in FIGS. 2 and 3 a tire wheel 10 mounted on an axle 11.

Tire wheel 10 has an annular hub 12 which has a through hole 13 for receiving the axle 11 and a plurality of circumferentially spaced bores 14. Bores 14 receive threaded fasteners 15 for fastening the hub 12 to an annular carcass 18 of the tire wheel 10. The carcass is the main structural component of the tire wheel other than the hub 12 and the tread to be described.

The carcass 18 is made from a glass fiber reinforced plastic or a graphite epoxy composite material of woven fabric layered composite. Carcass 18 has a pair of axially spaced web portions 19 and 20 which are essentially flat annular plates or sections that merge at their outer radial peripheries with C-shaped portions of the carcass which define the spaced rigid sidewalls 21 and 22 of the tire wheel 10. In the conventional pneumatic tires, the shoulder of a tire is the outer radial portion that merges with the crown of the tire, which is an annular outer portion of the tire. In the non-pneumatic tire wheel of the described embodiment, the uppermost circumferential radial portions of each sidewall has axially spaced annular shoulder portions or shoulders 24 and 25 that merge with an annular circumferentially extending crown 28. The outermost circumferential surface of crown 28 has a ring 29 made of similar rigid composite material. An elastomeric tread 31 is suitably adhered to the ring 29 with its respective side portions merging with the shoulders 24 and 25. As viewed in cross section the carcass 18 of the tire wheel 10 begins at the hub and extends as a continuous curve outwardly and thence inwardly as a continuous curve that merges into the tread.

The sidewalls 21 and 22 have a plurality of circumferentially spaced slots 32 that begin in the web portions 19 and 20 and extend through the sidewalls and terminates in the crown 28 of the tire carcass 18. As illustrated in FIG. 5 the slots 32 as opposite each other and with the respective ends of the slots ending into an annular shaped hole which is achieved by first drilling the slot ends and then connecting them. The respective diameters of the annular end holes is equal to the slot widths to minimize local stress concentrations. Additional slots or slits 34 are located within the sidewalls 19 and 20 between adjacent slots 32, however such slots or slits 34 extend from the crown and into the sidewall a distance that is close to the web portions but do not extend as far as slots 32 which terminate in the web portions. This arrangement of slots 32 and 34 create a series of beam members that provide a yielding and resiliency to the tire carcass 18 under load and impact conditions. By controlling the spacing of the slots and their termination points on the sidewall and web structure, it is easier to control the resiliency of the tire wheel. Additional slots 33 located between slots 32 and 34 are located within the crown and shoulder portion. The purpose here is to provide enough slots to help define the beam structure that provides for the controlled yielding and optimized strength. By increasing the number of slots in the outer radial sidewall portion of the tire one can optimize the strength of the material by maintaining the width between slots more consistent. The circumferential distance from the terminal end of one slot to an adjacent slot are substantially equal to further optimize the strength of the beam members in the tire carcass. As disclosed in the lower portion of FIG. 3 the respective beam structures in the sidewall 22 of the carcass closely adjacent to web portion 19 (designated "A") are thicker in cross section than those portions of the beam structures of the sidewall 22 (designated "B") adjacent to the shoulder 25. By so increasing the thicknesses adjacent to the hub section there is a corresponding reduction in the bending stress at this portion of the beam structure, thereby enhancing the performance of the non-pneumatic tire wheel.

The hub 12 along with the tire carcass 18 and the ring 29 defines a toroidal shape where toroidal is defined by its conventional meaning as a surface generated by the rotation of a plane closed curve about an axis lying in its plane and not intersecting it as a doughnut shape.

The hub 12 has a radially outwardly extending flange portion 36 that is recessed along its one outer side portion to receive a circumferentially extending shock absorber member 38 that is curvilinear in cross-section. The shock absorber 38 may be suitably connected to the hub 12. The curvilinear shape of the shock absorber may be S-shaped with the outer periphery having an annular ring 37 of elastomeric material adhered thereto. In addition, such shock absorber member 38 has a plurality of circumferentially spaced slots 39, 40 and 41 which together with the elastomeric ring 37 enhance the shock absorbing characteristics thereof. Slots 40 and 41 do not extend as far radially inwardly toward flange 36 as slots 39 to optimize the strength of the shock absorber 38. In the same manner slots 41 do not extend as far radially inwardly toward flange 36 as slots 40.

Figure 8:
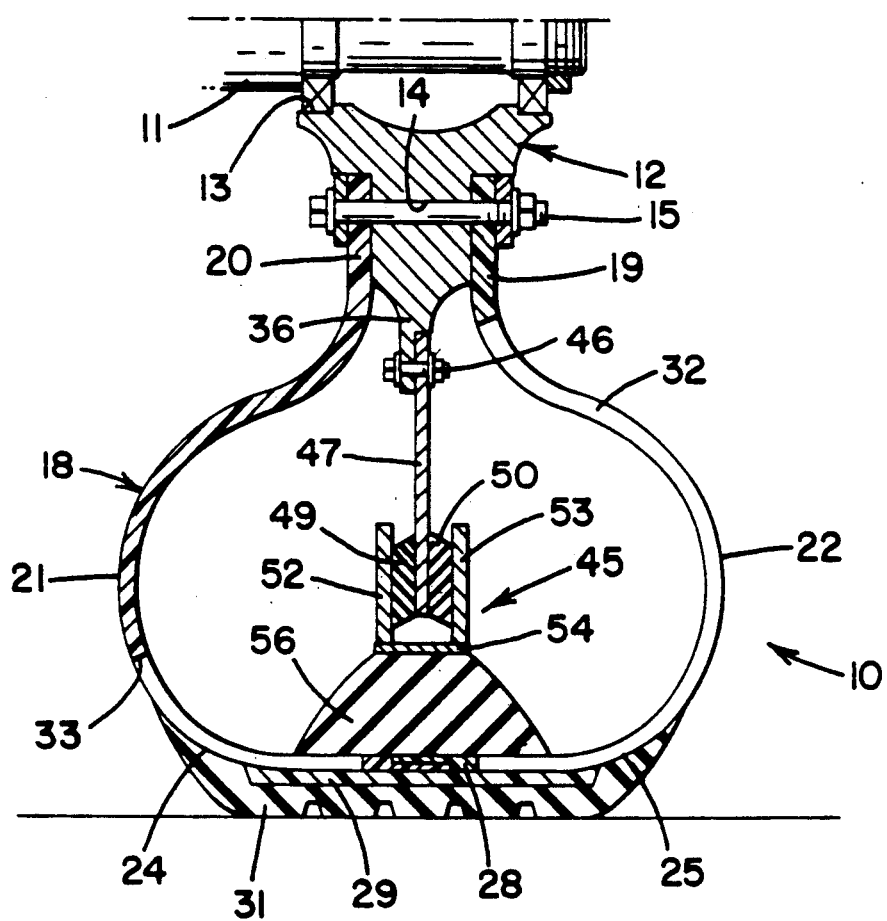
FIG. 8 is a front elevational view of a tire wheel structure similar to FIG. 7 but with a modified shock absorber means.

A modification of the shock absorber 38 is shown in FIG. 8 wherein the tire wheel 10 is identical to that described above, having annular carcass 18 mounted on axle 11 via annular hub 12 as in the first embodiment. The carcass 18 has the axially spaced web portions 19 and 20 with the spaced rigid sidewalls 21 and 22, and annular shoulders 24 and 25 that merge with the crown 28, ring 29 and tread 31. As in the first described embodiment, the hub 12 has a radially outwardly extending flange portion 36 that is suitably recessed along its one outer side portion to receive a circumferentially extending shock absorber 45 that is connected thereto via bolts 46. Shock absorber 45 has an annular radially outwardly extending circular flange 47, which flange 47 has suitably adhered or connected thereto along its outer side edges a pair of annular elastomeric members 49 and 50. The axial outer sides of the elastomeric members 49 and 50 are suitably connected or adhered to a pair of annular plates 52 and 53 respectively. The plates 52 and 53 have their outermost radial edges connected to an annular plate 54, which in turn is suitably connected to an annular resilient member or annular elastomeric member 56 to enhance the shock absorbing characteristics thereof.

It will be apparent that, although a specific embodiment and certain modifications of the invention have been described, the invention is not limited to the specifically illustrated and described constructions since variations may be made without departing from the principles of the invention.

What is claimed is:

1. A non-pneumatic tire wheel comprising a hub section for receiving an axle; said hub section having a central bore with a central axis; a yieldable annular carcass extending radially outwardly from said hub section to cooperatively define a toroidal shape therewith; said carcass having a pair of axially spaced sidewalls, a pair of axially spaced circumferentially extending shoulders and an annular crown; said crown being generally linear in cross section and parallel to said central axis, said crown merges with said shoulders; said sidewalls merge with said shoulders and said hub section; a tread ring encompassing said crown and integral therewith to define a ground engaging element; each of said sidewalls having a plurality of circumferentially spaced slots that extend radially from adjacent said hub section into said annular crown; and said slots being spaced to define a plurality of circumferentially spaced beam members that extend radially on both sides of said tire wheel that provide a yielding and resiliency to said tire wheel under load.

2. A non-pneumatic tire wheel as set forth in claim 1 wherein each of said sidewalls is C-shaped in cross section with concave inner surfaces facing each other.

3. A non-pneumatic tire wheel as set forth in claim 2 wherein adjacent ones of said circumferentially spaced slots are of uneven length.

4. A non-pneumatic tire wheel as set forth in claim 3 wherein said carcass is of a rigid plastic material.

5. A non-pneumatic tire wheel as set forth in claim 4 wherein a rigid ring member is adhered to said carcass between said annular crown and said tread ring.

6. A non-pneumatic tire wheel as set forth in claim 5 wherein said hub has an outer circumferentially extending and radially outwardly extending flange, a circumferentially extending shock absorber secured to said flange, said shock absorber having an outer periphery, an elastomeric ring secured to said outer periphery of said shock absorber and said circumferentially extending shock absorber having a plurality of circumferentially spaced slots therein to provide resiliency to said tire wheel.

7. A non-pneumatic tire wheel as set forth in claim 6 wherein adjacent ones of said circumferentially spaced slots in said shock absorber are of uneven length to provide resiliency to said shock absorber.

8. A non-pneumatic tire wheel as set forth in claim 6 wherein said sidewalls that merge with said crown is a continuous curve in cross section.

9. A non-pneumatic tire wheel as set forth in claim 5 wherein said hub has an outer circumferentially extending and radially outwardly extending flange, an annular shock absorber member secured to said flange, the outer periphery of said shock absorber spaced radially inwardly from said annular crown and operative to contact and abut said annular crown to absorb impact loading to said tire wheel.

10. A non-pneumatic tire wheel as set forth in claim 9 wherein said shock absorber has a pair of annular elastomeric rings with each elastomeric ring having a pair of annular side surfaces, one surface of each of said annular side surfaces is secured to said flange, the remaining surface of each of said annular side surfaces of said annular elastomeric ring having an annular plate member secured thereto, and a circumferentially extending annular resilient member secured to said plate members to provide a shock absorbing function on overload to said tire wheel.

11. A non-pneumatic tire wheel as set forth in claim 2 wherein the respective ends of said slots are arcuate in shape with a diameter equal to the width of said slots.

12. A non-pneumatic tire wheel as set forth in claim 9 wherein said hub has an outer circumferentially extending flange that extends into the chamber defined by said annular carcass, a circumferentially extending overload shock absorber secured to said flange, said shock absorber having an outer periphery that is spaced radially inwardly from said crown for contact with said crown for absorbing impact energy therefrom under load.

13. A non-pneumatic tire wheel as set forth in claim 12 wherein a rigid ring member of plastic material is adhered to said carcass between said annular crown and said tread ring.

14. A non-pneumatic tire wheel as set forth in claim 13 wherein said circumferentially extending shock absorber member has a curvilinear cross section, and said outer periphery of said shock absorber member is yieldable along a radial plane that is normal to the central axis of said central bore.

15. A non-pneumatic tire wheel as set forth in claim 13 wherein said curvilinear cross section is S-shaped.

16. A non-pneumatic tire wheel as set forth in claim 13 wherein said carcass is a graphite epoxy filament wound material.

17. A non-pneumatic tire wheel as set forth in claim 13 wherein said composite material is a graphite epoxy woven fabric layered composite.

18. A non-pneumatic tire wheel as set forth in claim 13 wherein said carcass is made from a glass fiber reinforced plastic.

19. A non-pneumatic tire wheel as set forth in claim 14 wherein said outer periphery of said shock absorber has an annular ring of elastomeric material adhered thereto.

20. A non-pneumatic tire wheel as set forth in claim 19 wherein said shock absorber member has a plurality of circumferentially spaced radially extending slots therein to enhance the impact loading of the tire wheel.

21. A non-pneumatic tire wheel as set forth in claim 20 wherein said curvilinear cross section is S-shaped.

22. A non-pneumatic wheel comprising: a hub section for receiving an axle, said axle having a center line about which said wheel can rotate, said hub section having a pair of axially spaced end portions, a resilient annular toroidal wheel body section extending radially and axially outwardly away from said spaced end portions of said hub section, a tread ring encompassing and secured to said wheel body section at its peripheral portion distal from said hub section, said body section having a plurality of circumferentially spaced slots extending radially from closely adjacent said hub section of said wheel body section to within the outer peripheral portion that is encompassed by said tread portion to define a plurality of circumferentially spaced beam members on both sides of said annular toroidal wheel body to provide resiliency to said wheel, and each of said beam members having portions adjacent to said hub section that extend in a direction that has a component that is substantially axially away from a plane that is normal to said center line and bisects said hub section.

23. A non-pneumatic wheel as set forth in claim 22 wherein the cross section of said annular wheel body section taken on a plane that passes radially from said center line defines a width as measured from the radial outward most portions of said annular wheel body that is greater than the height of said wheel body as measured from the tread connection to where said body section is connected to said hub to enhance the resiliency of such wheel.

24. A non-pneumatic wheel as set forth in claim 23 wherein said cross section shape presents a pair of opposed C-shaped sections, and each C-shaped section has two opposing portions that are substantially identical in contour.

* * * * *